No. 708,506. Patented Sept. 2, 1902.
G. V. VALENTINE.
DRESS CUTTING INSTRUMENT FOR DRAFTING GARMENTS.
(Application filed July 5, 1901. Renewed Aug. 11, 1902.)

(No Model.) 5 Sheets—Sheet 1.

Witnesses:
E. H. Wilson
J. C. Stetson

Gustaf V. Valentine
Inventor

No. 708,506. Patented Sept. 2, 1902.
G. V. VALENTINE.
DRESS CUTTING INSTRUMENT FOR DRAFTING GARMENTS.
(Application filed July 5, 1901. Renewed Aug. 11, 1902.)
(No Model.) 5 Sheets—Sheet 2.
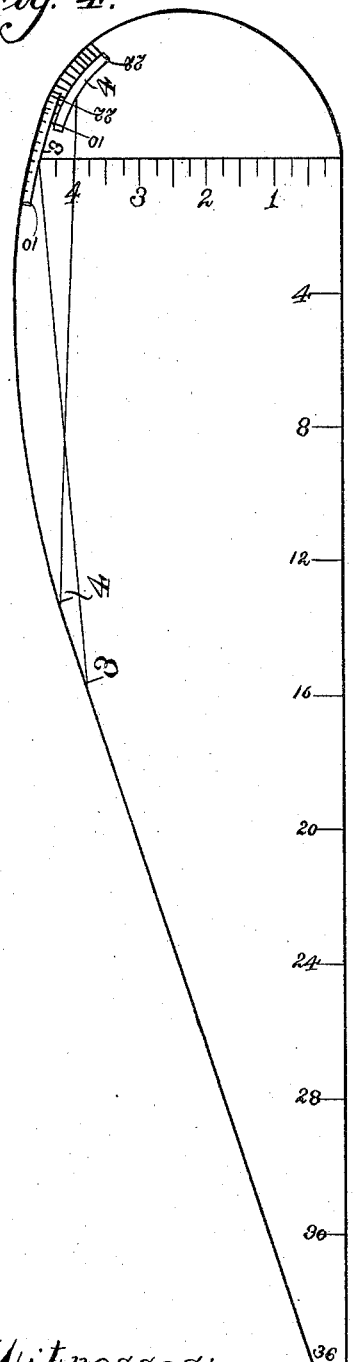
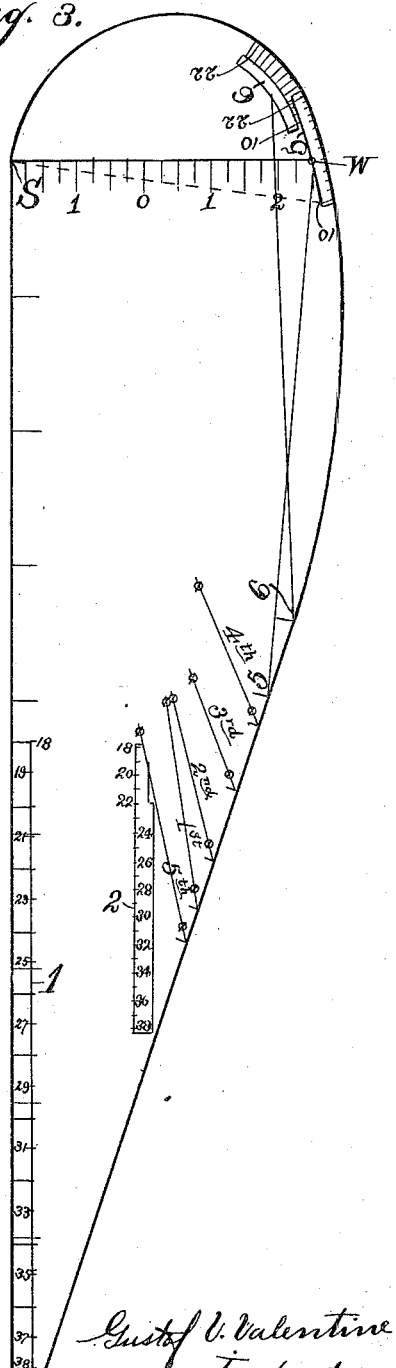
Witnesses:
E. F. Wilson
J. C. Stetson
Gustaf V. Valentine
Inventor.

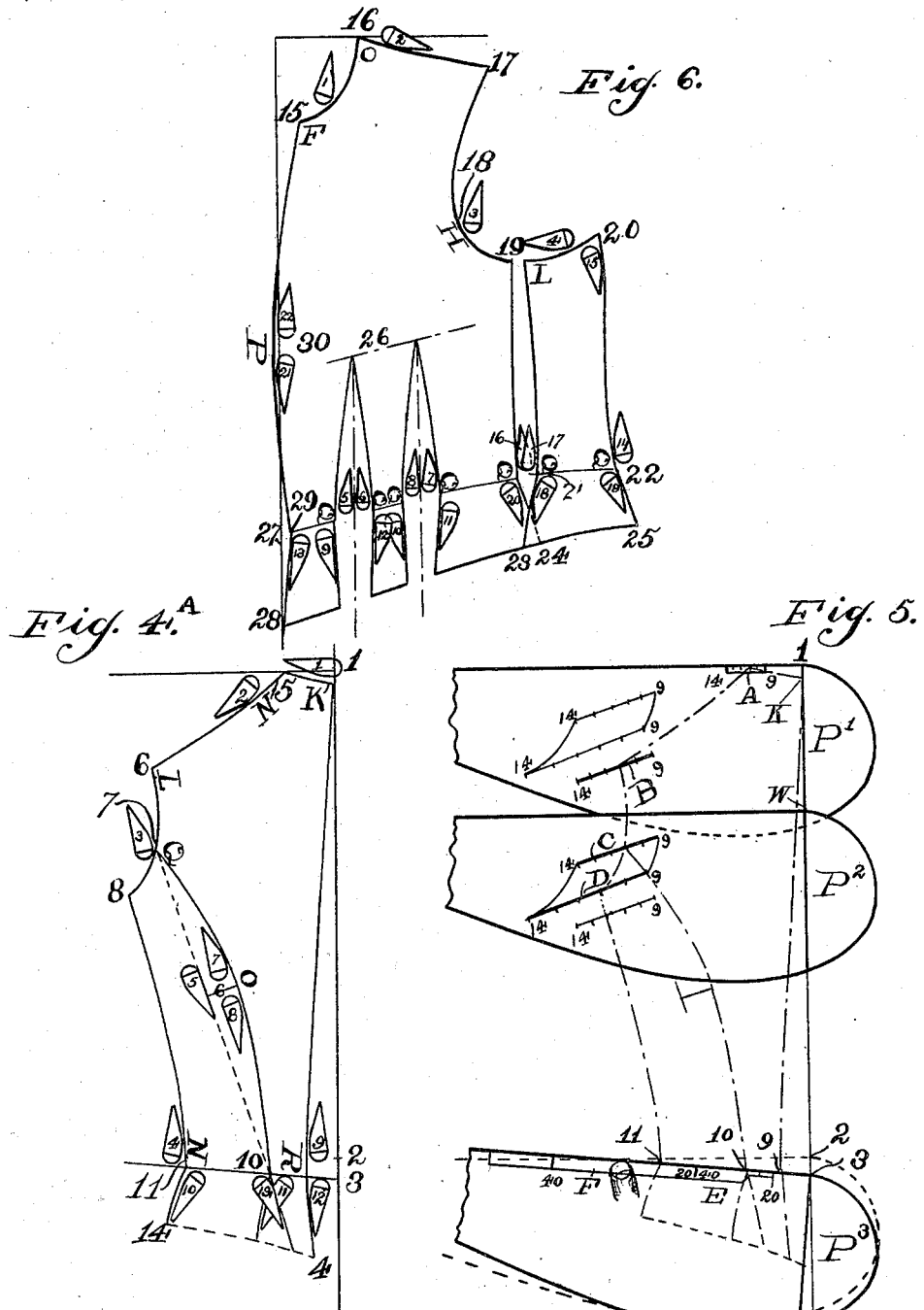

No. 708,506. Patented Sept. 2, 1902.
G. V. VALENTINE.
DRESS CUTTING INSTRUMENT FOR DRAFTING GARMENTS.
(Application filed July 5, 1901. Renewed Aug. 11, 1902.)
(No Model.) 5 Sheets—Sheet 4.
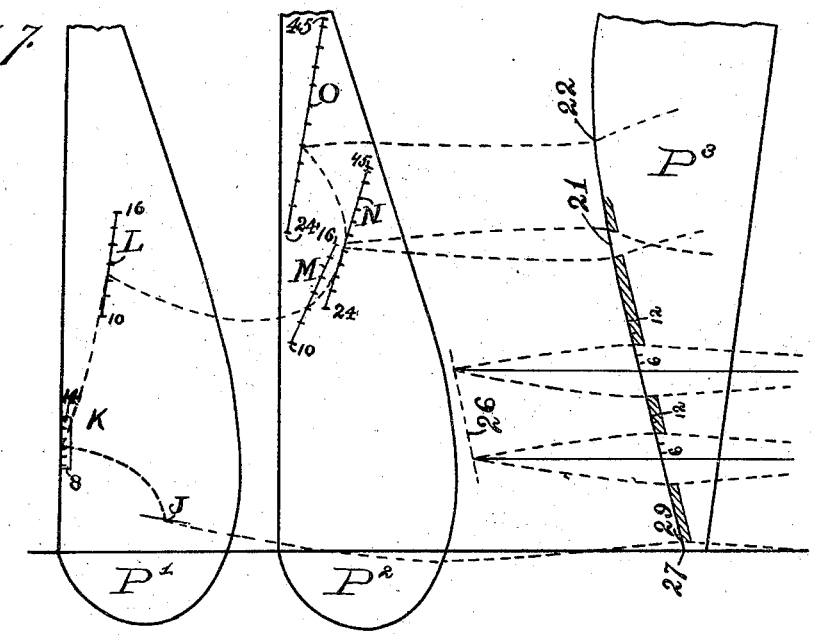
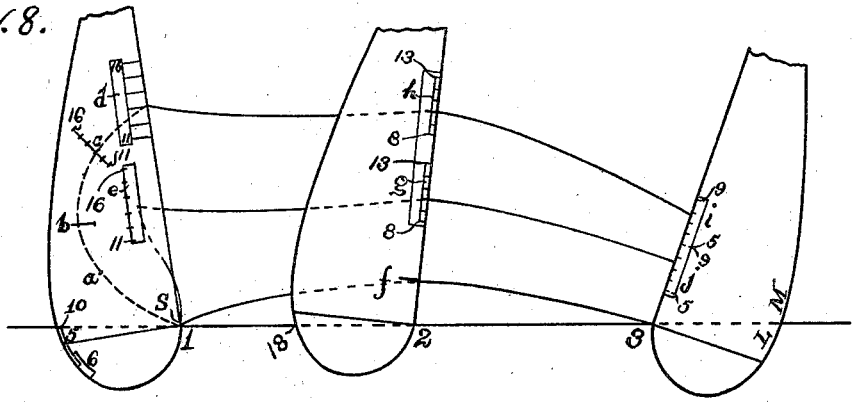
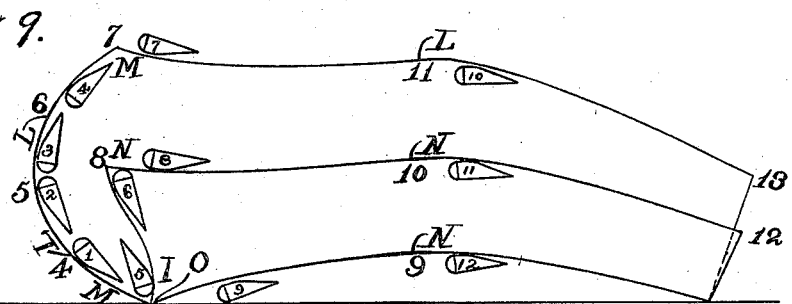
Witnesses: E. F. Wilson, J. C. Stetson. Gustaf V. Valentine, Inventor.

No. 708,506. Patented Sept. 2, 1902.
G. V. VALENTINE.
DRESS CUTTING INSTRUMENT FOR DRAFTING GARMENTS.
(Application filed July 5, 1901. Renewed Aug. 11, 1902.)
(No Model.) 5 Sheets—Sheet 5.

Witnesses:
E. F. Wilson
J. C. Stetson

Gustaf V. Valentine
Inventor:

UNITED STATES PATENT OFFICE.

GUSTAF V. VALENTINE, OF CHICAGO, ILLINOIS.

DRESS-CUTTING INSTRUMENT FOR DRAFTING GARMENTS.

SPECIFICATION forming part of Letters Patent No. 708,506, dated September 2, 1902.

Application filed July 5, 1901. Renewed August 11, 1902. Serial No. 119,222. (No model.)

*To all whom it may concern:*

Be it known that I, GUSTAF V. VALENTINE, a citizen of the United States, residing at Chicago, in the county of Cook and State of Illinois, have invented certain new and useful Improvements in Charts for Drafting Ladies'-Dress Patterns; and I do hereby declare the following to be a full, clear, and exact description of the invention, such as will enable others skilled in the art to which it appertains to make and use the same.

My invention relates to an improved instrument or tool adapted to be used in drafting ladies' waist, skirt, and sleeve patterns, the object being to produce an instrument of this character by the help of which patterns for waists, skirts, and sleeves may be drawn without any mathematical calculation on the part of the draftsman and which can be readily understood and applied; and it consists in the features of construction and combinations of parts hereinafter fully described and claimed.

Figure 1:
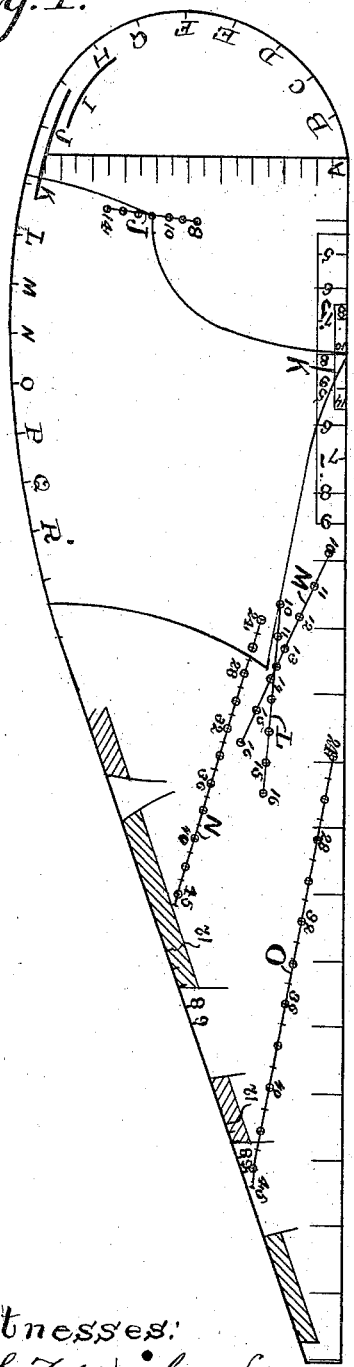
Figure 2:
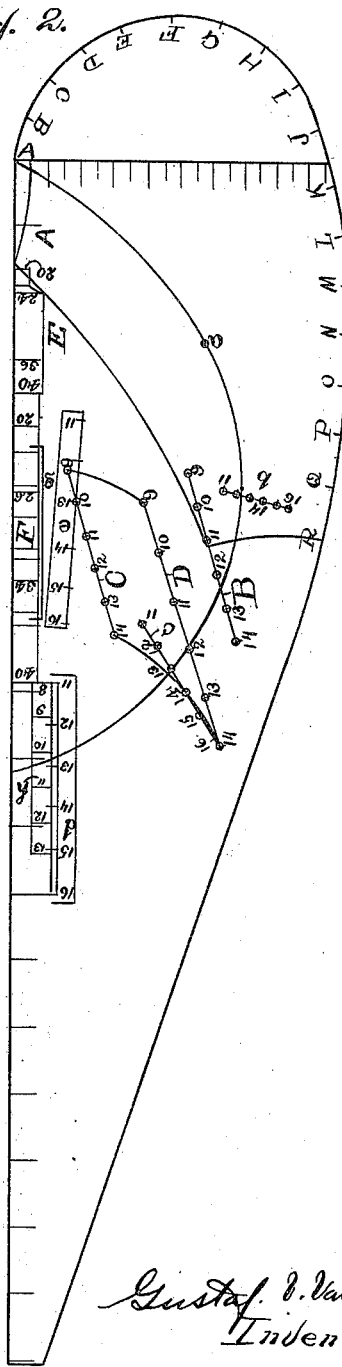
Figures 10, 11:
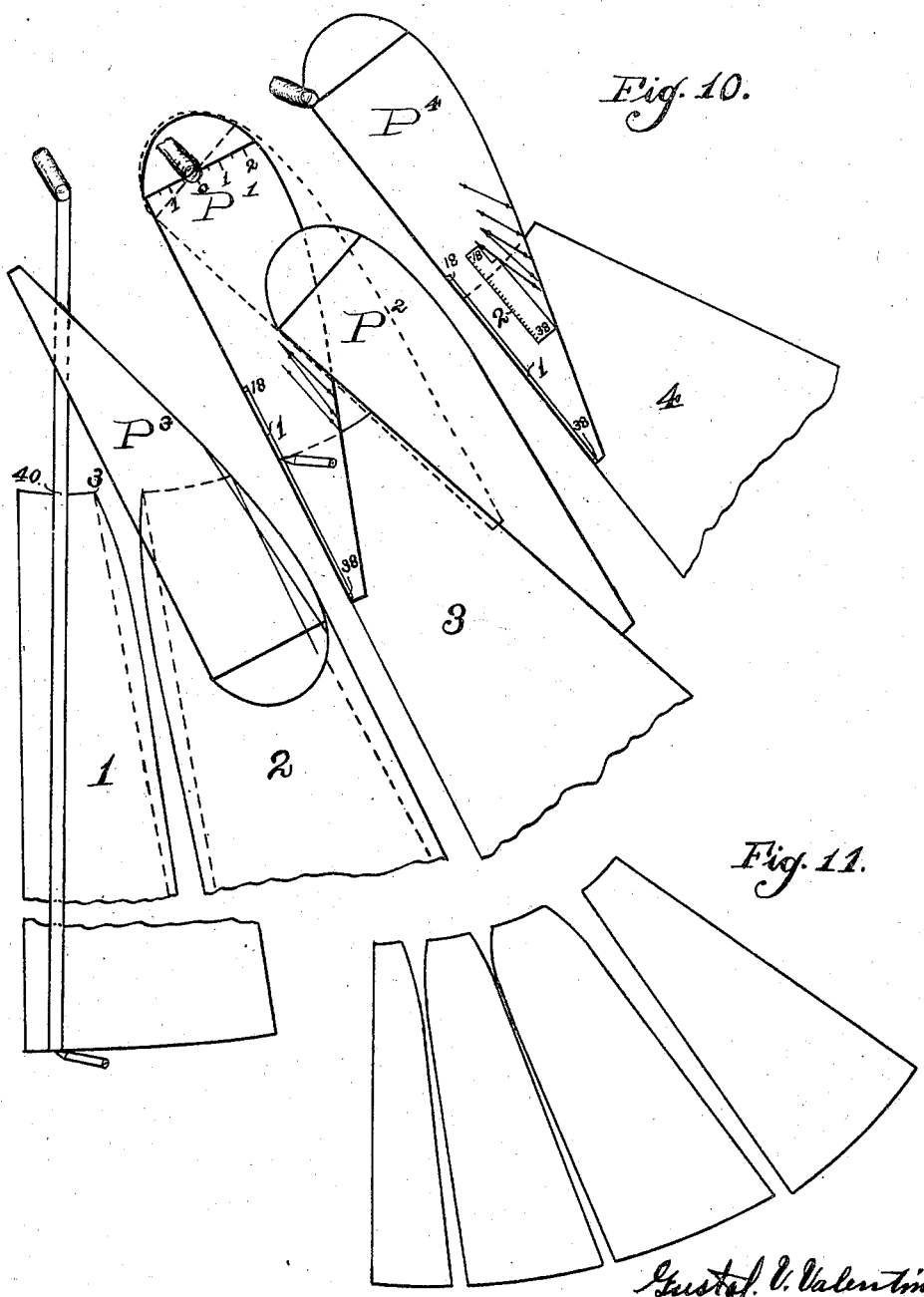

In the accompanying drawings, illustrating my invention, Figure 1 is a plan view of one side of the instrument, showing the scales, &c., which are used in drawing the front of the waist-garment pattern. Fig. 2 is a similar view of the reverse side, showing the scales which are used in drafting the patterns for the back of the waist-garments and the sleeve-patterns. Fig. 3 is a similar view of the same side as Fig. 2, showing the scales which are used in drafting the skirt-patterns. Fig. 4 is a similar view of the same side as Fig. 1, showing the scales which are used in drafting the hip-curves on the gores of the skirt. Fig. 5 shows the various positions in which the instrument is placed to establish the points in drafting the pattern for the back of the waist-garment. Fig. 4ª shows the various positions in which the instrument is placed in drawing the curves of the back of the waist-pattern. Fig. 6 shows the various positions in which the instrument is placed in drawing the curves of the front of the waist. Fig. 7 shows the various positions in which the instrument is placed in establishing the various points for drafting the front of the waist. Fig. 8 shows the positions in which the instrument is placed in establishing the points in drafting a sleeve-pattern. Fig. 9 shows the positions in which the instrument is placed in drawing the curves of a sleeve-pattern. Fig. 10 shows the positions in which the instrument is placed in drafting a skirt-pattern. Fig. 11 shows the outlines of a skirt-pattern as drawn by the use of the instrument.

In drafting a dress-pattern by the help of this instrument there are three separate and distinct steps to be taken. First, the measurements are taken as ordinarily done with a tape-line; second, the various important points on the pattern are established, and, third, the curves or outlines of the pattern are drawn.

To establish the various points on the pattern I have arranged various scales on the instrument in such positions and numbered according to various measurements, so that when the instrument is placed in certain positions on the pattern definite points can be marked on the pattern which establish the junctures of two curves or lines or some other important points. To facilitate the marking of the various points the principal points of the scales which are not on the edge or referred to the edge are provided with perforations adapted to admit the point of a pencil. After the various important points have been established the curved outlines of the pattern are indicated by placing the instrument in certain definite positions, as indicated by the scales and other characters on the instrument.

As indicated in Figs. 1 to 4, the instrument is somewhat fish-shaped in outline, having one large nearly semicircular end and being tapered toward the other end. One of the long edges is curved convexly for about half its length from the large end and is straight throughout the rest of its length. The other long edge is straight throughout its whole length. The curve of the large end and the curved portion of the one long edge has been determined by experience and is such that a certain definite portion of it will be adapted to indicate each curved line in the waist sleeve and skirt patterns. As shown in Figs. 1 to 4, the instrument is provided with a line on each side drawn at right angles to the long straight edge and meeting same at its juncture with the large curved end. This line is divided into inches "0" to "4" on one side and from "2" to "0" and "0" to "2" on the other. The use of this line will be shown later. I will now describe the various scales and what they are used for and will afterward show by means of the various diagrams how the instrument is applied to draw the different patterns. Beginning at this juncture of the long straight edge with the curve of the large end each side of the instrument is provided with a number of points nearly equally spaced around the large end and along the curved edge and lettered from "A" to "R." These are used in placing the instrument to draw the various curved lines of the patterns. Both sides of the instrument are provided with various scales figured between certain limits and placed on the instrument in such places that when the instrument is placed in certain predetermined positions on the drawing the divisions of the scales will determine the location of certain points on the pattern according to the measurements taken. Scales A, J, and K represent neck-measures varying from eight to fourteen inches and are used to determined points on the neck portion of waist-patterns. Scales O and N represent bust-measures varying from twenty-four to forty-five and are used to determine points on the front of waist-pattern. Scales E and F represent waist-measures varying from twenty to forty and are used to determine points on the back of waist-pattern at waist-line. Scales B, C, and D represent width of back from arm to arm, about three inches below the point of shoulder, varying from nine to fourteen inches, and are used in determining points on the back of waist-pattern. Scale M represents the width of front from arm to arm, about two and one-half inches below point of shoulder, varying from ten to sixteen inches, and is used in determining a point on the front of waist-pattern. Scale L is similar to scale M, but taken at shoulder, varying from ten to sixteen inches, and is used to determine a point in front of waist-pattern. Point S at the juncture of the long straight edge with curved end is used in placing the instrument in determining the points in the curve of the shoulder end of the sleeve-patterns. The point $a$ and the scales $b$, $c$, $d$, and $e$, which are on the curved line running from the point S nearly half the length of the long straight edge, are all used in determining points in the shoulder end or arm-size of the sleeve-pattern. The scales $b$, $c$, $d$, and $e$ vary from eleven to sixteen inches and represent arm-size measurements adjacent the shoulder. Scales $g$ and $h$ represent the elbow-measure, varying from eight to thirteen inches, and are used in determining points in the sleeve-patterns at elbow. Scales $i$ and $j$ represent hand-measures with the thumb compressed and are used to determine the hand or wrist size of the sleeve-pattern and vary from five to nine inches. Scales numbers 1 and 2 represent waist-sizes varying from eighteen to thirty-seven and are used in determining points and positions on the skirt-pattern. Scales 3, 4, 5, and 6 represent the difference between the waist and hip measures, varying from 10 to 22, and with the points "3," "4," "5," and "6" on the edge of the instrument which are connected to said scales 3, 4, 5, and 6 by straight lines are used in placing the instrument so as to draw the hip-curves on the various gores of the skirt-pattern. The hip-measure is taken six inches below the waist-line. The lines marked "1st," "2nd," "3rd," "4th," and "5th" are used to determine the back-lines of the various gores of the skirt. The shaded portions on the edge of the straight portion of the long curved edge of the instrument, together with the two scales also on this edge, are used in determining the positions of the darts in the waist-pattern. Said scales vary from 6 to 12 and represent the difference between the waist and bust measures.

In using this instrument in drafting the various patterns of a dress, a base-line is first drawn on which certain measurements are laid off and in relation to which certain points are determined, for instance, in drafting the back of a plain waist-pattern first draw the base-line 1–2, Fig. 5. Then place the instrument in the first position as indicated at P', with the long straight edge at right angles to the base-line near the end to the right of the base-line with the straight edge to the right, draw a line along the straight edge of instrument about three inches long; mark at scale A the neck-size; mark at scale B the width of back-size, mark at K about one-fourth inch from "1" on base-line, and also mark at W according to "W" on the instrument four and one-half inches from S. Place the instrument in position No. 2, as indicated by P², similar to P', but with the edge at mark "W." Mark the width of back-size as indicated on scales C and D. To locate the third position, measure along the base-line from "1" to "2" the length of back, and mark point 3 one-half inch to the left of point 2. Place the instrument at point 2, as indicated in dotted lines, so that the straight edge is at right angles to the base-line. Place the point of finger on the straight edge of the instrument six inches from the base-line and swing the instrument around on said point as a pivot until the edge of the instrument is at point 3, as shown in full lines P³. Draw a line from point of finger to base-line, mark point 9 three-fourths of an inch from base-line at edge of instrument, and mark the waist-measure as indicated in scales E and F. Having thus established the various points, it only remains to draw the curved lines, as indicated in Fig. 4ª. The small figures in the shape of the instrument placed alongside of the curves and numbered "1" to "13" indicate the instrument. The letters along the curved edge of the instrument are placed even with the corresponding letters on the diagram. For instance, for curve 1, or as it may be called the "neck curve," place letter "K" on the instrument even with the point marked K on the diagram and draw the curve. Next place the instrument so that "N" on the instrument is even with N on the diagram, the edge of the instrument also passing through point L, and draw the curve, and so on for each position marked on the diagram. The dotted line 5 through the diagram is a straight line passing through points 7 and 10, and line 6 is one inch long, drawn at right angles to line 5 at about its middle point, as indicated, and is used to determine the meeting-point of curves 7 and 8. The lines below the waist-line have no fixed points, but may easily be made by placing the instrument as indicated by 10, 11, 12, and 13.

In Figs. 6 and 7 I have illustrated how to draw the outlines for the front of a plain waist-pattern. To determine the points in the pattern draw a base-line as before, place curved rule in position No. 1, which is near the end of base-line to the left, see that it is at right angle with base-line, then draw a line along the straight edge from base-line five inches long; mark the neck-measure in scale J, mark size of neck in scale K, mark width of chest in scale L. This last point establishes the length of shoulder of the front. Lay off a point on the base-line six inches to the right of position 1 which establishes position 2. Place curved rule in position No. 2, and see that it is at right angle with base-line and even with point made, then mark in width of chest scale M, then mark in bust-measure, scale N, then mark in bust-measure, scale O, it is now advisable to draw curves between points made and for direction for the same consult diagram Fig. 6. The curves are 1, 2, 3, and 4. Turn the curved rule as indicated by the figure alongside of the curves and place the letters on curved rule even with letters on diagram—as, for instance, letter "F" on curved rule even with letter "F," as shown on diagram, then draw curve 1 from letter "F" to letter "O" on curved rule; curve 2, letter "O," on curved rule even with letter "O" as shown on diagram; curve 3, letter "H" on curved rule even with letter "H" as shown on diagram; curve 4, letter "L," on curved rule even with letter "L" as shown on diagram. Before placing the instrument in position 3 $P^3$ establish points 22, 26, and 27. This is done as follows: The length of waist under the arm from point 20 to point 22 is the same as the back from point 8 to point 11. (See diagram Fig. $4^a$.) Point 22 is straight below point 20. Point 26, the height of the top end of darts, is established by deducting the measure from a distance derived as follows: When measuring from the socket-bone in back of neck to the waist-line in front, notice the measure to a point on the tape from the socket-bone to a point about one inch above the largest portion of bust. Having determined this measure, deduct, as said, the distance between points 1 and 5, Fig. $4^a$, from same and use the remainder as a radius and point 16, Fig. 6, as a center and mark 26. Point 27 is established by subtracting the distance from point 1 to point 5, Fig. $4^a$, from the length of waist from socket-bone in back of neck and measuring with this distance down from point 16. Draw a line at 26 or height of dart. This line should be on such a slant that it will pass through the top of the second dart, which should be one-half inch higher than the top of first dart. Place the instrument in position 3 $P^3$ small end at point 27 or at the length of front on base-line and the curved edge of the instrument on point 22. Then draw the waist-line from 22 to 27. Mark points on waist-line as indicated on the edge of the instrument. The first point is one-fourth of an inch from base-line. The next point is the front of first dart and is always the same. The next point is the farther side of first dart and is determined by marking on the first scale the difference between the waist and bust measure. The next point is the front line of second dart and is always the same. The next point is the back line of second dart and is determined by marking in second scale the difference between the bust and waist measures. Next mark the center of the darts on waist-line and draw lines through same parallel with base-line. Now draw curves 5, 6, 7, and 8; then lines 9, 10, 11, 12, and 13; also curves 14 and 15, as indicated in Fig. 6. The diagram should be checked up on the waist-line to see that it corresponds with the measure taken. It will usually be a little full. This may be deducted at point 21 and the curves 21 to 19 then drawn, as indicated, Fig. 6.

To draft a sleeve-pattern, draw a base-line. Place curved rule in position No. 1, as shown P', Fig. 8. This position establishes all points at arm-size. Place "S" and No. 10, scale 5, even with base-line, as shown in the figure. Mark at "S" point 1 on the base-line. Mark at $a$ on the sleeve-curve. Mark arm-size in scales $b$, $c$, $d$, and $e$, which last is for the under-arm pattern. Draw curves between these points, as indicated in the diagram, Fig. 9. To establish position 2, measure from 1 to 2 on base-line, Fig. 8, the length of arm from shoulder to elbow, and to establish position 3 measure on base-line from 2 to 3 the length of arm from elbow to hand. Place the instrument in position 2, as shown in Fig. 8, "S" on the instrument at point 2 on the base-line. Also move the rule so that "18" in scale 5 at the opposite edge of rule will also be on the base-line. Then mark in scales $g$ and $h$ the elbow-size. Point $f$ is always two inches from point 2. Place the instrument in position 3, as indicated at $P^3$, Fig. 8, with the small end up, "A" on the instrument on the base-line and the base-line appearing between "L" and "M" at the other side of the instrument. Then mark the hand-size in scales *i* and *j*. Then draw the curves through the various points as established, as indicated in Fig. 9.

A lady's skirt is made up of a more or less number of pieces called "breadths" or "gores," and these are numbered from the middle in front to the middle at the back, as first, second, third, &c. To draft the first gore, draw a base-line. Place the straight edge of the instrument on the base-line, small end pointing to the left, as indicated at P', Fig. 10. Place the finger at the "0" point in the "2" to "0," "0" to "2" scale at the large end of the instrument and allow the instrument to turn on this point as a pivot. Use the distance to the waist-measure in scale 1 as a radius and draw a circle. This will be the top line of the gore. The back line of the gore will be established by the direction of the line marked first when the instrument is in position P', Fig. 10. This will establish the dotted line, as shown on the first gore and also point 3 at the top end of the gore. To draw the hip curve, the instrument is placed in position, as indicated at P³, Fig. 10, with the small end up. Place point 3, which is on the curved edge of the instrument, at 3, the top back corner of gore. Then move the instrument so that the difference between the waist and hip measure in scale No. 3 is also on the back line already established. Then draw the curve from 3 along the instrument toward the bottom and finish it with a straight line. The curves of the second and third gores are drawn in the same manner, scale No. 5 being used for the front of the second gore and scale No. 4 for the back of same. Scale No. 6 is used for the front of the third gore, and scale No. 3 is used for the back of the third gore. The fourth gore has no curves, but is made up of straight lines. Instead of placing the finger at "0" in the scale for drawing the waist-line of the fourth gore place it at "A" or about one and three-fourths inches to the left of same, and instead of using the waist size in waist-scale No. 1 for a radius use such a number in waist-scale No. 1 which is in line with the waist size in waist-scale No. 2. For instance, referring to Fig. 3, waist size "24" on waist-scale No. 2 is opposite No. 21 on waist-scale No. 1, which is the point which should be used in drawing the top end of the fourth gore. The back line of gore is determined, as before, by the line marked "4th." The circle of the bottom of the skirt may be made with the use of a tape-line in the usual manner. On one side of the instrument a cord is drawn at right angles to said long straight edge, beginning at the junction of said long straight edge and said large curved end or at the point S. Said cord is divided into inches and quarters and is numbered from "2" to "0" and "0" to "2," beginning with the point "S" with "2," "0" being practically in the center of the instrument. When the skirt is the same length front and back, the top and bottom are circled from "0" of the "2" to "0," "0" to "2" scale, as indicated on the third gore, Fig. 10; but should the back be longer than the front, circle the top from point "0" and the bottom by holding the tape just as far to the right of "0" as the back is longer than the front. Should the front be longer than the back, circle the bottom from "0" and the top by placing point of finger to hold the tape just as far to the right of "0" as the front is longer than the back.

I claim as my invention—

1. A chart or instrument for drafting garments, cut out of thin material, having one long straight edge one end of which is tangential to a large convex curved end which is practically semicircular and which merges into a convex curve of larger radius, said convex curve approaching said straight edge and extending about one-half its length and terminating in a tangential straight line which continues to approach said first-mentioned edge, so that the instrument practically ends in a point, together with the scales on opposite sides of the chart arranged in respect to the edges of the chart in the manner shown and described.

2. A chart or instrument for drafting garments, of a somewhat fish-shaped outline as described, provided with a large curved end, practically semicircular, which merges into a convex curve of larger radius on one edge and into a straight line on the opposite edge, said convex curve of larger radius ending in a tangential straight line which approaches the opposite edge of the instrument, said curved edge and end being adapted, when the instrument is placed in predetermined positions to indicate the curves of the various patterns comprising a lady's dress, together with the scales on opposite sides of the instrument, arranged on said instrument in the manner and for the purposes set forth.

3. A chart or instrument for drafting patterns for ladies' garments comprising a thin flat instrument of a somewhat fish-shaped outline, having one long straight edge terminating tangentially to a large convex curved end, which is practically semicircular and which merges into a convex curve of larger radius terminating in a tangential straight line which approaches said first-mentioned line, and provided with certain scales on its edges representing certain measurements and also with other scales on the body of the instrument removed from the edges, representing various other measurements ordinarily taken, said scales varying between the usual limits of the corresponding measurements and being placed on the instrument in such relation to the outlines of same that when said instrument is placed in certain predetermined positions the various points in the scales will indicate various points on the diagram agreeing with the corresponding measures.

4. In a chart or instrument for drafting patterns for ladies' garments, comprising a thin flat fish-shaped instrument having one long straight edge terminating tangential to a large convex curved end practically semicircular, which merges into a convex curve of larger radius, which approaches said straight edge extending about half the length of same and which ends in a tangential straight line which continues to approach said straight edge, the end of the instrument opposite to said large curved end being quite narrow, scales on said instrument corresponding with the usual measurements, said scales being graduated between the ordinary limits of the corresponding measurements and provided with perforations at the principal points in same adapted to admit the point of a pencil for the purpose of marking on the pattern.

5. A chart or instrument for drafting patterns for ladies' garments, of a somewhat fish-shaped outline as described, provided with one long straight edge ending in a large curved end of constantly-increasing radius though nearly semicircular, said large curved end merging into a convex curve of large radius which extends nearly parallel with said long straight edge and about one-half its length, said large curve ending in a tangential straight line which approaches said long straight edge, said instrument being provided with a number of diagonal lines which are so placed on the instrument that when the long straight edge of said instrument is placed on one vertical edge of a skirt-gore pattern one of said diagonal lines will determine the direction of the other vertical edge of said gore, substantially as described.

6. A chart or instrument for drafting patterns for ladies' garments, of a somewhat fish-shaped outline as described, provided with one long straight edge ending in a large curved end of constantly-increasing radius though nearly semicircular, said large curved end merging into a convex curve of large radius which extends nearly parallel with said long straight edge and about one-half its length, said large curve ending in a tangential straight line which approaches said long straight edge, said instrument being provided with a scale divided into inches and quarters extending at a right angle to said long straight edge, and beginning at the junction of said long straight edge with said large curved end, the second inch division from the starting-point of said scale being marked "0" and numbers running right and left from said "0" point, forming what might be called a right-and-left scale, substantially as described.

GUSTAF V. VALENTINE.

In presence of—
  WM. ELMORE FOSTER,
  M. A. WILLIAMS.